US007349585B2

(12) United States Patent
Ii

(10) Patent No.: US 7,349,585 B2
(45) Date of Patent: Mar. 25, 2008

(54) IMAGE PROCESSING SYSTEM THAT INTERNALLY TRANSMITS LOWEST-RESOLUTION IMAGE SUITABLE FOR IMAGE PROCESSING

(75) Inventor: Yasuhiro Ii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 710 days.

(21) Appl. No.: 10/678,460

(22) Filed: Oct. 3, 2003

(65) Prior Publication Data

US 2005/0041873 A1 Feb. 24, 2005

(30) Foreign Application Priority Data

Oct. 3, 2002 (JP) .............................. 2002-291047

(51) Int. Cl.
*G06K 9/32* (2006.01)
(52) U.S. Cl. .................................................... 382/299
(58) Field of Classification Search ................ 382/299, 382/244; 709/247; 345/698, 3.3, 3.4
See application file for complete search history.

(56) References Cited

U.S. PATENT DOCUMENTS

| 5,727,159 | A | * | 3/1998 | Kikinis ...................... 709/246 |
| 6,023,714 | A | * | 2/2000 | Hill et al. .................... 715/513 |
| 6,300,947 | B1 | * | 10/2001 | Kanevsky ................... 715/866 |
| 6,668,101 | B2 | * | 12/2003 | Kaneda ........................ 382/301 |
| 6,678,420 | B1 | * | 1/2004 | Takeo et al. .................. 382/240 |
| 6,763,139 | B1 | * | 7/2004 | Andrew ...................... 382/240 |
| 6,922,487 | B2 | * | 7/2005 | Dance et al. ................ 382/190 |
| 6,987,890 | B2 | * | 1/2006 | Joshi et al. .................. 382/240 |
| 7,024,046 | B2 | * | 4/2006 | Dekel et al. ................. 382/240 |
| 7,030,845 | B2 | * | 4/2006 | Maa ............................ 345/88 |
| 7,062,107 | B1 | * | 6/2006 | Crosby et al. .............. 382/299 |
| 7,068,857 | B1 | * | 6/2006 | Touchard et al. ........... 382/299 |
| 7,110,608 | B2 | * | 9/2006 | Chan et al. ................. 382/239 |
| 7,130,474 | B2 | * | 10/2006 | Luo et al. ................... 382/239 |
| 2002/0161796 | A1 | * | 10/2002 | Sylthe ......................... 707/500 |
| 2003/0086615 | A1 | * | 5/2003 | Dance et al. ............... 382/200 |

FOREIGN PATENT DOCUMENTS

JP      02414876      8/1992

OTHER PUBLICATIONS

Martin Boliek et al., "JPEG 200 for Efficient Imaging in a Client/Server Environment," Applications of Digital Image Processing XXIV, Proceedings of SPIE vol. 4472 (2001).*

(Continued)

*Primary Examiner*—Jingge Wu
*Assistant Examiner*—Jeffrey S Smith
(74) *Attorney, Agent, or Firm*—Blakely, Sokoloff, Taylor & Zafman LLP

(57) ABSTRACT

In one embodiment, an image processing system includes a first computer that processes image and a second computer connected with the first computer via a network. The second computer transmits the image to the first computer via the network after adjusting the resolution of the image to the lowest resolution determined by the first computer so that the first computer can process the transmitted image. Accordingly, the first computer can process the transmitted image at a satisfactory level, and at the same time, the image processing system can reduce network traffic therein.

1 Claim, 15 Drawing Sheets

OTHER PUBLICATIONS

Gene Wu et al., "New Compression Paradigms in JPEG2000," Applications of Digital Image Processing XXIII, Proceedings of SPIE vol. 4115 (2000).*

Sachin Deshpande et al., "HTTP Streaming of JPEG2000 Images," IEEE 2001.*

Amir Said et al., "Reversible image compression via multiresolution representation and predictive coding," Proceedings of SPIE (1993).*

* cited by examiner

DECOMPOSITION_LEVEL_0

DECOMPOSITION_LEVEL_1

DECOMPOSITION_LEVEL_2

DECOMPOSITION_LEVEL_3

FIG.5B

|  | 1LL | | | | | 1HL | | | |
|---|---|---|---|---|---|---|---|---|---|
| LAYER # = 0 | -84 | -84 | -77 | -79 | | 1 | -1 | 8 | 4 | ← COEFFICIENT |
|  | − | − | − | − | | + | − | + | + | ← SIGNATURE (MSB) |
| LAYER # = 1 | 1 | 1 | 1 | 1 | | 0 | 0 | 0 | 0 | |
|  | 0 | 0 | 0 | 0 | | 0 | 0 | 0 | 0 | ABSOLUTE VALUE OF COEFFICIENT |
|  | 1 | 1 | 0 | 0 | | 0 | 0 | 0 | 0 | |
| LAYER # = 2 | 0 | 0 | 1 | 1 | | 0 | 0 | 1 | 0 | |
| LAYER # = 3 | 1 | 1 | 1 | 1 | | 0 | 0 | 0 | 1 | |
|  | 0 | 0 | 0 | 1 | | 0 | 0 | 0 | 0 | |
|  | 0 | 0 | 1 | 1 | | 1 | 1 | 0 | 0 | (LSB) |

|  | 1LH | | | | | 1HH | | | |
|---|---|---|---|---|---|---|---|---|---|
|  | -1 | 0 | -1 | -5 | | 2 | 2 | -2 | 4 |
|  | − | 0 | − | − | | + | + | − | + |
|  | 0 | 0 | 0 | 0 | | 0 | 0 | 0 | 0 |
|  | 0 | 0 | 0 | 0 | | 0 | 0 | 0 | 0 |
|  | 0 | 0 | 0 | 0 | | 0 | 0 | 0 | 0 |
|  | 0 | 0 | 0 | 0 | | 0 | 0 | 0 | 0 |
|  | 0 | 0 | 0 | 1 | | 0 | 0 | 0 | 1 |
|  | 0 | 0 | 0 | 0 | | 1 | 1 | 1 | 0 |
|  | 1 | 0 | 1 | 1 | | 0 | 0 | 0 | 0 |

FIG.9

| 00 | 01 | 02 | 03 | 04 |
|----|----|----|----|----|
| 10 | 11 | 12 | 13 | 14 |
| 20 | 21 | 22 | 23 | 24 |
| 30 | 31 | 32 | 33 | 34 |
| 40 | 41 | 42 | 43 | 44 |
| 50 | 51 | 52 | 53 | 54 |

FIG.10

| SOC | MH | 00 | 01 | 02 | 03 | 04 | 10 | 11 | 12 | 13 | 14 | 20 | 21 | 22 | 23 | 24 | 30 | 31 | 32 | 33 | 34 | 40 | 41 | 42 | 43 | 44 | 50 | 51 | 52 | 53 | 54 | EOC |

IMAGE PROCESSING SYSTEM THAT INTERNALLY TRANSMITS LOWEST-RESOLUTION IMAGE SUITABLE FOR IMAGE PROCESSING

The present application claims priority to the corresponding Japanese Application No. 2002-291047 filed on Oct. 3, 2002, the entire contents of which are hereby incorporated by reference.

BACKGROUND OF THE INVENTION

1. Field of the Invention

The present invention generally relates to a client computer, a server computer, a program, a recording medium, an image data processing system and a method of processing image data.

2. Description of the Related Art

Image processing systems for processing image data are available. Some image processing systems perform the following functions: converting text images into text data (Optical Character Reader, or OCR), eliminating distortion of images, determining the direction of images based on the recognition ratio of characters included in the images, and extracting a title of a text image based on the layout of the text image, for example.

Image processing systems are often distributed processing systems such as client-server systems in which server computers provide client computers with image processing services. The client computers retain the image data of original images and access the server computers when the client computers need image processing services of the server computers. The image data are transmitted from the client computers to the server computers.

In the case of OCR processing, for example, the recognition ratio of the text image depends on the resolution of the text data of the text image because OCR processing uses the outlines of characters. The lower the resolution of text data is, the more difficult it is to distinguish similar characters. Accordingly, the resolution of text data is desired to be as high as possible for accurate recognition.

The amount of image data, however, increases as the resolution of image data increases. In the case of client server systems, an increase in the amount of image data transmitted from the client computers to the server computers results in an increase in network traffic.

SUMMARY OF THE INVENTION

A method and systems for transmitting the lowest-resolution image suitable for image processing is disclosed. In one embodiment, a computer is connected via a network with another computer that processes images, and the computer comprises: a resolution adjusting unit that adjusts the resolution of an original image to form a resolution-adjusted image based on resolution information indicating a resolution suitable for image processing by the other computer, and an image transmitting unit that transmits the resolution-adjusted image to the other computer.

BRIEF DESCRIPTION OF THE DRAWINGS

FIG. 5B is a schematic diagram for illustrating the concept of layer structure;

FIG. 9 is a schematic diagram showing tile-components divided in a 2-dimensional plane;

FIG. 10 is a data diagram showing compressed data generated with the JPEG 2000 algorithm from the tile-components;

DETAILED DESCRIPTION OF THE PREFERRED EMBODIMENTS

Accordingly, one embodiment of the present invention provides a novel and useful image processing system in which the resolution of image data and network traffics therein are well balanced.

In one embodiment, a computer connected via a network with another computer that processes images, according to one embodiment of the present invention, includes: a resolution adjusting unit that adjusts the resolution of an original image thereby to form a resolution-adjusted image based on resolution information indicating a resolution suitable for image processing by the other computer; and an image transmitting unit that transmits the resolution-adjusted image to the other computer.

Accordingly, the computer adjusts the resolution of image based on the resolution information indicating the suitable resolution for the image processing apparatus, and transmits the resolution-adjusted image the resolution of which is suitable for image processing by the other computer via the network. Since the resolution of the resolution-adjusted image is the lowest resolution that is higher than the resolution suitable for image processing by the other computer, the other computer can process the transmitted resolution-adjusted image at a satisfactory precision, and at the same time, the data size of the transmitted resolution-adjusted image data is reduced, and potentially minimized, which results in reduced network traffic.

The above computer, according to another embodiment of the present invention, may further include: a query transmitting unit that transmits a query for the resolution information to the other computer; and an information receiving unit that receives the resolution information transmitted by the other computer in response to receipt of the query transmitted by the query transmitting unit.

Accordingly, the computer transmits a query for the resolution information to the other computer, and obtains the resolution information.

According to a third embodiment of the present invention, a computer connected with another computer via a network, includes: an image processing unit that processes images; a query receiving unit that receives a query for resolution information from the other computer; an information transmitting unit that, in response to receipt of the query received by the query receiving unit, transmits the resolution information indicating a resolution suitable for image processing by the image processing unit, to the computer.

Accordingly, the computer, in response to the query from the other computer, transmits the resolution information needed for image processing.

Other objects, features, and advantages of the present invention will be more apparent from the following detailed description when read in conjunction with the accompanying drawings.

The preferred embodiments of the present invention are described below with reference to the drawings.

First, a multi-level coding algorithm and a JPEG 2000 algorithm are described.

Figure 1:
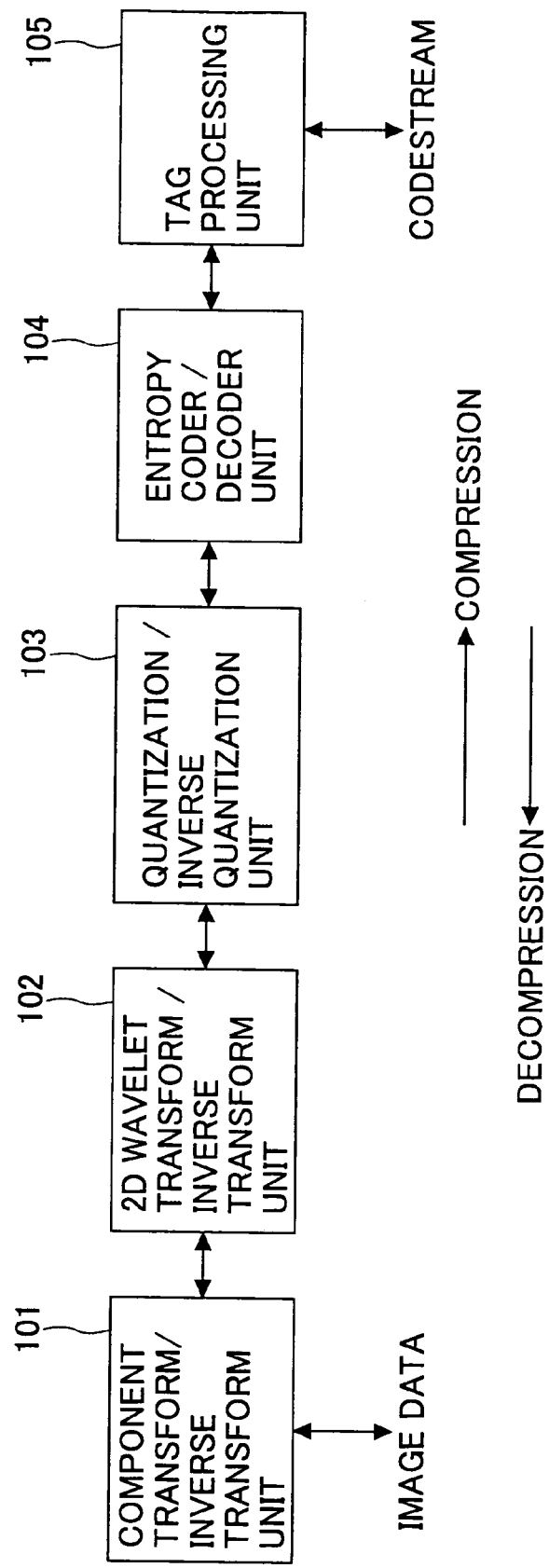
FIG. 1 is a block diagram showing a JPEG 2000 image coding system.

FIG. 1 is a block diagram of a system that embodies the multi-level coding algorithm that is the basis of JPEG 2000. The system includes a component transform/inverse transform unit 101, a 2-dimensional wavelet transform/inverse transform unit 102, a quantization/inverse quantization unit 103, an entropy encoder/decoder unit 104, and a tag processing unit 105.

This system is different from a conventional system of JPEG in the transform method. Although the JPEG uses Discrete Cosine Transform (DCT), JPEG 2000 uses Discrete Wavelet Transform (DWT) that is performed by the 2D wavelet transform/inverse transform unit 102. DWT is advantageous to DCT in that the quality of highly compressed images by DWT is better than that of highly compressed images by DCT. This is one of the major reasons why the JPEG 2000, a successive image compression algorithm to JPEG, uses DWT.

Another major difference is that the tag processing unit 105 is provided at the final stage of the JPEG 2000 system. When compressing the image data, the tag processing unit 105 generates compressed data as a codestream, and when decompressing the compressed data, interprets the codestreams needed for the decompression. Codestreams realize various convenient functions of JPEG 2000. For example, a still image can be compressed and/or decompressed up to an arbitrary decomposition level corresponding to an octave division of block-based DWT (see FIG. 3 and the description relating thereto). Accordingly, a low resolution image (shrunk image) can be extracted from a file. A portion of the image (tiling image) can be extracted too.

The source images are often input and/or output through the component transform/inverse transform unit 101. For example, the component transform/inverse transform unit 101 transforms the source images represented in primary colors, Red (R), Green (G), and Blue (B) or complimentary colors, Yellow (Y), Magenta (M), and Cyan (C), into images represented in YUV or YCbCr, or vice versa.

The JPEG 2000 algorithm is described below.

Technical terms related to JPEG 2000 are defined in JPEG 2000 Part 1, Final Draft International Standard (FDIS), the entire contents of which are hereby incorporated by reference. Some technical terms are defined as follows:

1. Code-block: A rectangular grouping of coefficients from the same sub-band of a tile-component.

2. Decomposition level: A collection of wavelet sub-bands where each coefficient has the same spatial impact or span with respect to the source component samples. These include the HL, LH, and HH sub-bands of the same 2-dimensional sub-band decomposition. For the last decomposition level, the LL sub-band is also included.

3. Precinct: A rectangular sub-division of a transformed tile-component, within each resolution level, used for limiting the size of packets.

4. Layer: A collection of compressed image data from coding passes of one, or more, code-blocks of a tile component. Layers have an order for encoding and decoding that must be preserved.

5. Region of interest (ROI): A collection of coefficients that are considered of particular relevance by some user-defined measure.

Figure 2:
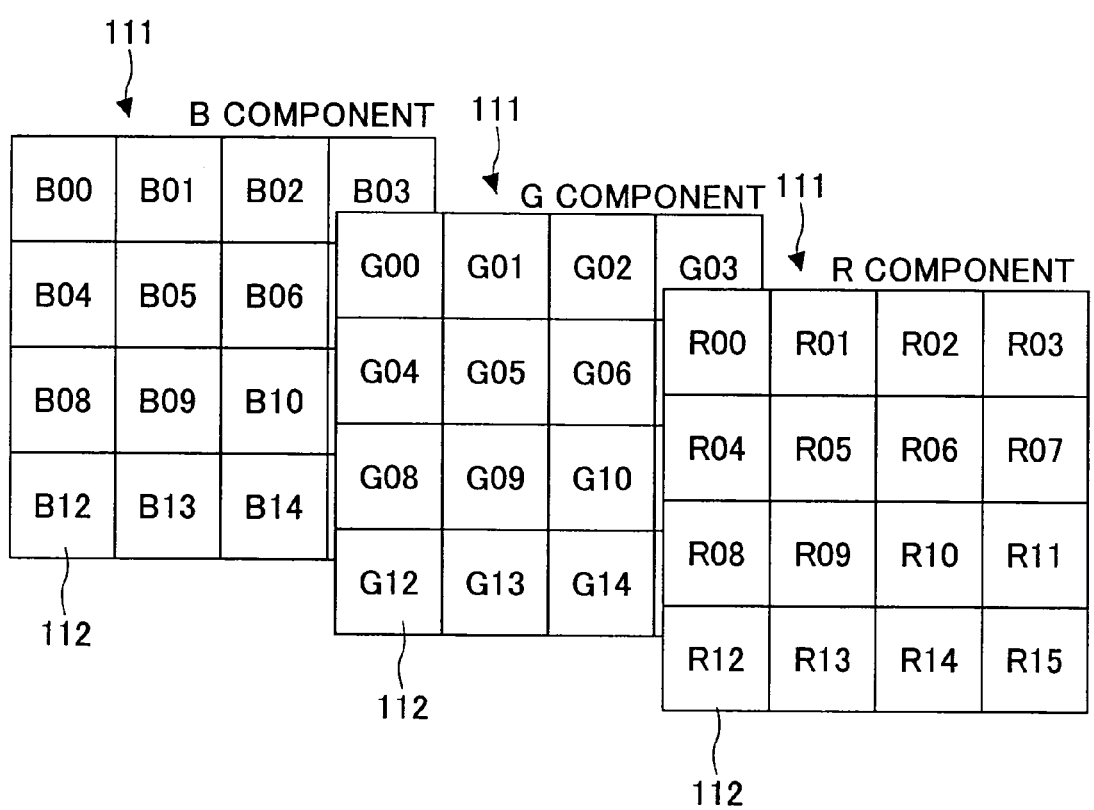
FIG. 2 is a schematic diagram showing tile-components of source image data.
Figure 3A:
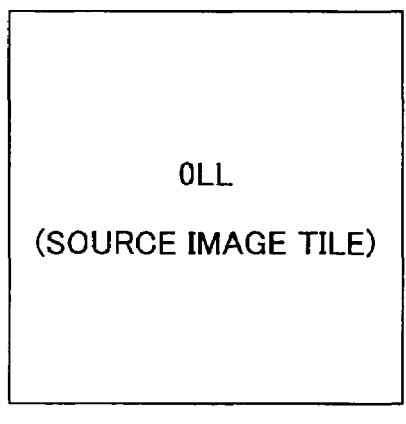
FIGS. 3A-3D are schematic diagrams, each showing a sub-band of a decomposition level.
Figure 3B:
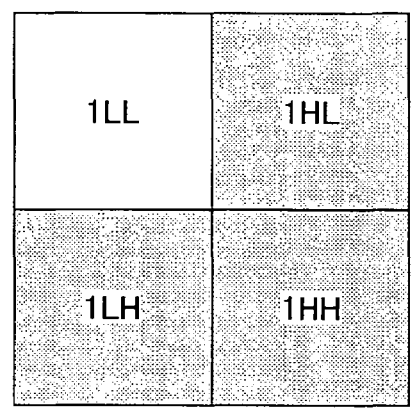
Figure 3C:
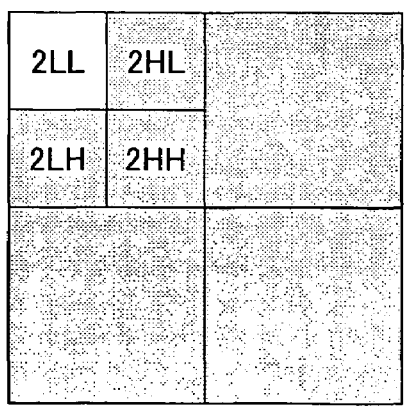
Figure 3D:
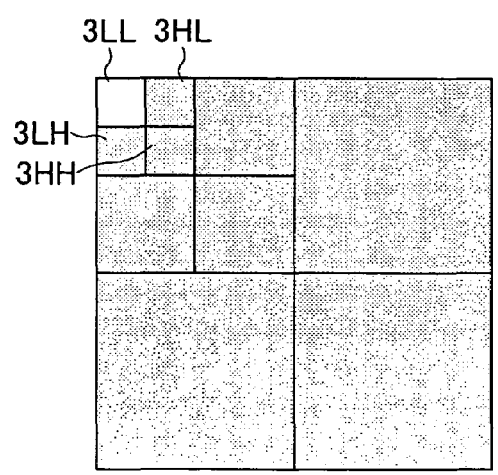

As shown in FIG. 2, components 111 (represented in RGB primary colors) of a color image are generally divided into tiles (the tiles may be referred to as "blocks"). In this case, each component 111 is divided into 4×4(=16) tiles 112. The tiles 112, that is, R00, R01, . . . , R15, G00, G01, . . . , G15, B00, B01, . . . , B15, are compressed and/or decompressed. The image data are compressed and decompressed by the tiles 112 of the components 111, independently.

Encoding of image data is described below. Image data of a tile 112 of a component 111 are input to the component transform/inverse transform unit 101 as shown in FIG. 1. After component transform, the image data are transformed with two-dimensional wavelet transform (forward transform) by the 2D wavelet transform/inverse transform unit 102 into frequency domain data.

FIG. 3 shows sub-bands of decomposition levels. A tile-component 0LL (decomposition level 0) obtained by dividing a source image into tiles is transformed with 2D wavelet transform, and divided into sub-bands (1LL, 1HL, 1LH, and 1HH) of decomposition level 1 as shown in FIG. 3B. The low frequency component 1LL is transformed with 2D wavelet transform, and divided into sub-bands (2LL, 2HL, 2LH, and 2HH) of decomposition level 2 as shown in FIG. 3C. Then, the low frequency component 2LL is transformed with 2D wavelet transform, and divided into sub-bands (3LL, 3HL, 3LH, and 3HH) of decomposition level 3 as shown in FIG. 3D.

In each decomposition level, the sub-bands that are encoded are shaded. For example, if the decomposition level is 3, the shaded sub-bands 3HL, 3LH, 3HH, 2HL, 2LH, 2HH, 1HL, 1LH, and 1HH are encoded. The sub-band 3LL is not encoded.

Then, bits to be encoded are identified in a designated order of encoding. The quantization/inverse quantization unit 103 generates contexts based on bits adjacent to the bits to be encoded.

Figure 4:
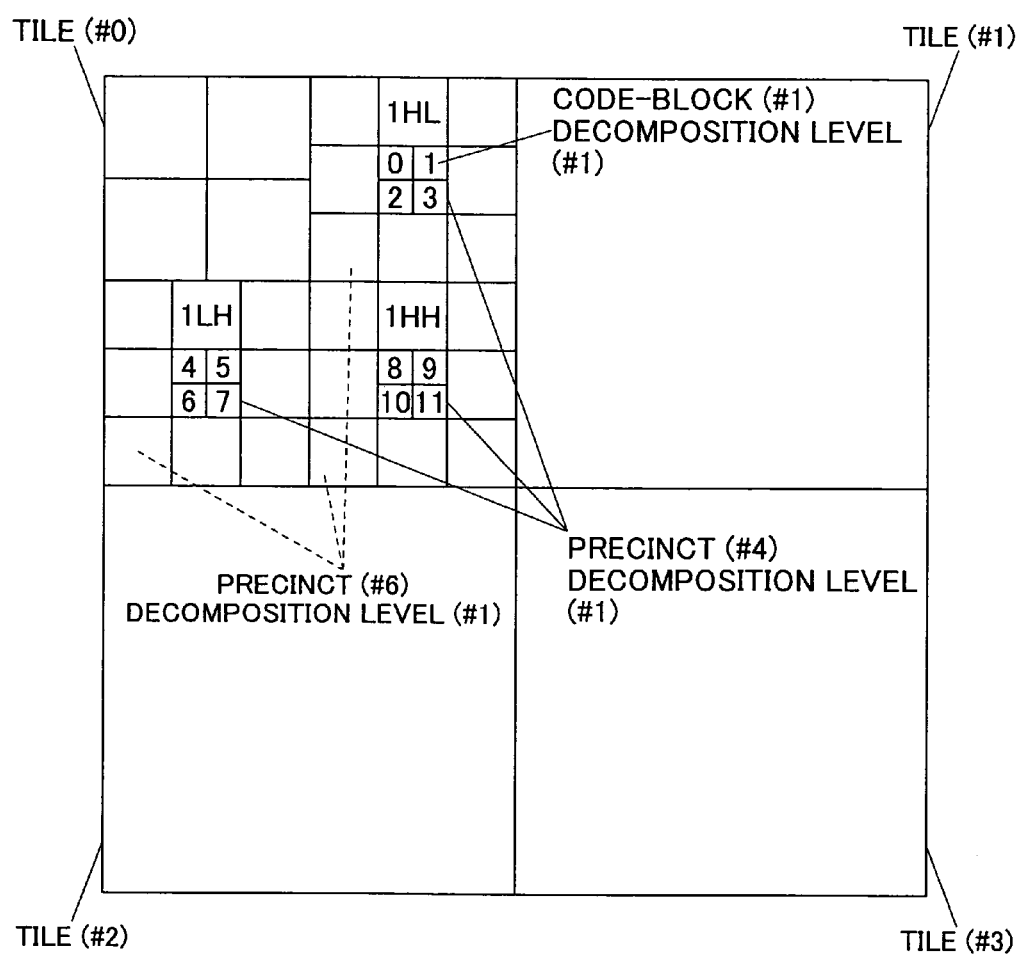
FIG. 4 is a schematic diagram for illustrating precincts.

Quantized wavelet coefficients are divided into "precincts", that is, non-overlapping rectangular regions, by the sub-bands. Dividing the quantized wavelet coefficients into precincts is introduced in order to use memory efficiently. As shown in FIG. 4, a precinct is formed by three spatially corresponding rectangular regions. Each precinct is divided into code-blocks, that is, non-overlapping rectangular regions. Entropy coding is performed by code-blocks.

The wavelet coefficients may be directly quantized and encoded. However, the wavelet coefficients may be divided into "bit planes". The bit planes may be ordered by a pixel or a code-block.

Figure 5A:
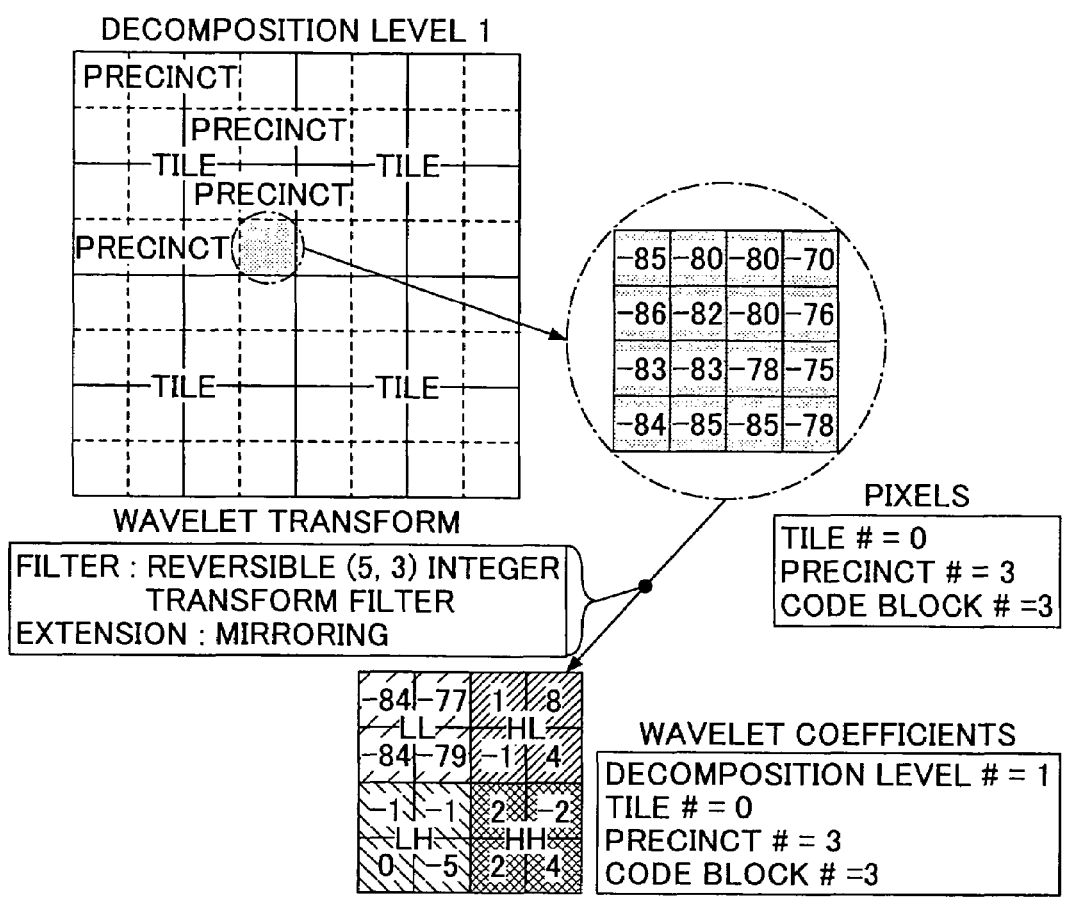
FIG. 5A is a schematic diagram for illustrating steps for ordering bit-planes.

FIG. 5A is a schematic diagram for illustrating the ordering of a bit plane. As shown in FIG. 5A, a source image (32×32 pixels) is divided into four tiles (16×16 pixels). It is assumed that the size of a precinct and a code-block of the decomposition level 1 are 8×8 pixels and 4×4 pixels, respectively. The precincts and the code-blocks are numbered in raster order. In this case, there are precincts No. 0-3 and code-blocks No. 0-3. Mirroring method is used for pixel extensions beyond the boundary of a tile. The wavelet transform is performed with a reversible (5, 3) filter. The wavelet coefficients of the decomposition level 1 are thus computed.

FIG. 5B is a schematic diagram for illustrating the concept of typical layer structure in the case of tile 0, precinct 3, code-block 3. The code-block is divided, after the wavelet transform, into 4 sub-bands (1LL, 1HL, 1LH, and 1HH). Wavelet coefficients of the code-block are assigned to the sub-bands as shown in FIG. 5B.

If the wavelet coefficients are looked at in the horizontal directions (bit-plane directions), the layer structure is relatively easy to understand. A layer is configured by a certain number of bit-planes. In this case, layers 0, 1, 2, 3 are configured by one, three, one, three bit planes. A layer including a bit-plane nearest to the Least Significant Bit (LSB) is quantized first. Similarly, a layer close to the Most Significant Bit (MSB) is quantized last. The method by which the closer a layer is to an LSB, the earlier the layer is disposed is called truncation. Quantization ratio can be finely adjusted with truncation.

The entropy encoder/decoder unit 104 shown in FIG. 1 encodes tiles 112 of each component 111 with a probability estimate based on the context and the bits to be encoded. All components 111 of the source image are encoded by a tile 112. Finally, the tag processing unit 105 combines all encoded data from the entropy encoder/decoder unit 104 into a codestream, and attaches a tag thereto.

Figure 6:
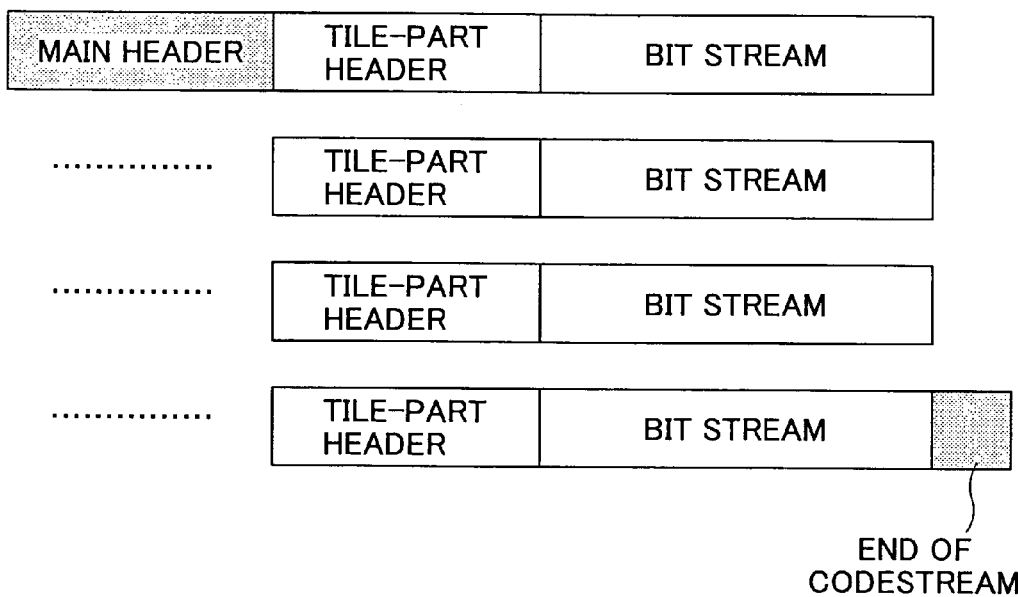
FIG. 6 is a data diagram showing the structure of a codestream.

FIG. 6 is a data diagram showing the structure of a codestream. Tag information called a main header and tile-part headers are attached at the top of the codestream and the bit streams of the tiles, respectively. The main header contains encoding parameters and quantization parameters, for example. The tile-part header indicates a boundary position of the tile, for example. Another tag (end of codestream) is attached at the end of the codestream.

When decoding the encoded data, image data is reproduced based on a codestream of each tile 112 of each component 111. In this case, the tag processing unit 105 interprets the tag information attached to the input codestreams, decomposes each codestream into codestreams of a tile 112 of a component 111, and decodes the codestream of each tile 112 of each component 111. The position of a bit that is decoded is determined in the order based on tag information in the codestream. The quantization/inverse quantization unit 103 generates context based on the arrangement of decoded peripheral bits adjacent to the bit position. The entropy encoder/decoder unit 104 decodes the context and the codestreams with a probability estimate, generates decoded bits, and writes the decoded bits at their positions. Data thus decoded are spatially divided by a frequency band. Tiles of each component of the image data are reproduced by inverse wavelet transforming the data by the 2D wavelet transform/inverse transform 102. The reproduced data are transformed by the component transform/inverse transform unit 101 into image data represented in the original color space.

The JPEG 2000 algorithm has been described.

A first embodiment of the present invention is described below. Although an example related to image compression/decompression techniques represented by JPEG 2000 is described, the present invention is not limited to the contents of the following description.

According to an embodiment of the present invention, a server computer and a client computer jointly process images by executing image processing programs installed therein.

Figure 7:
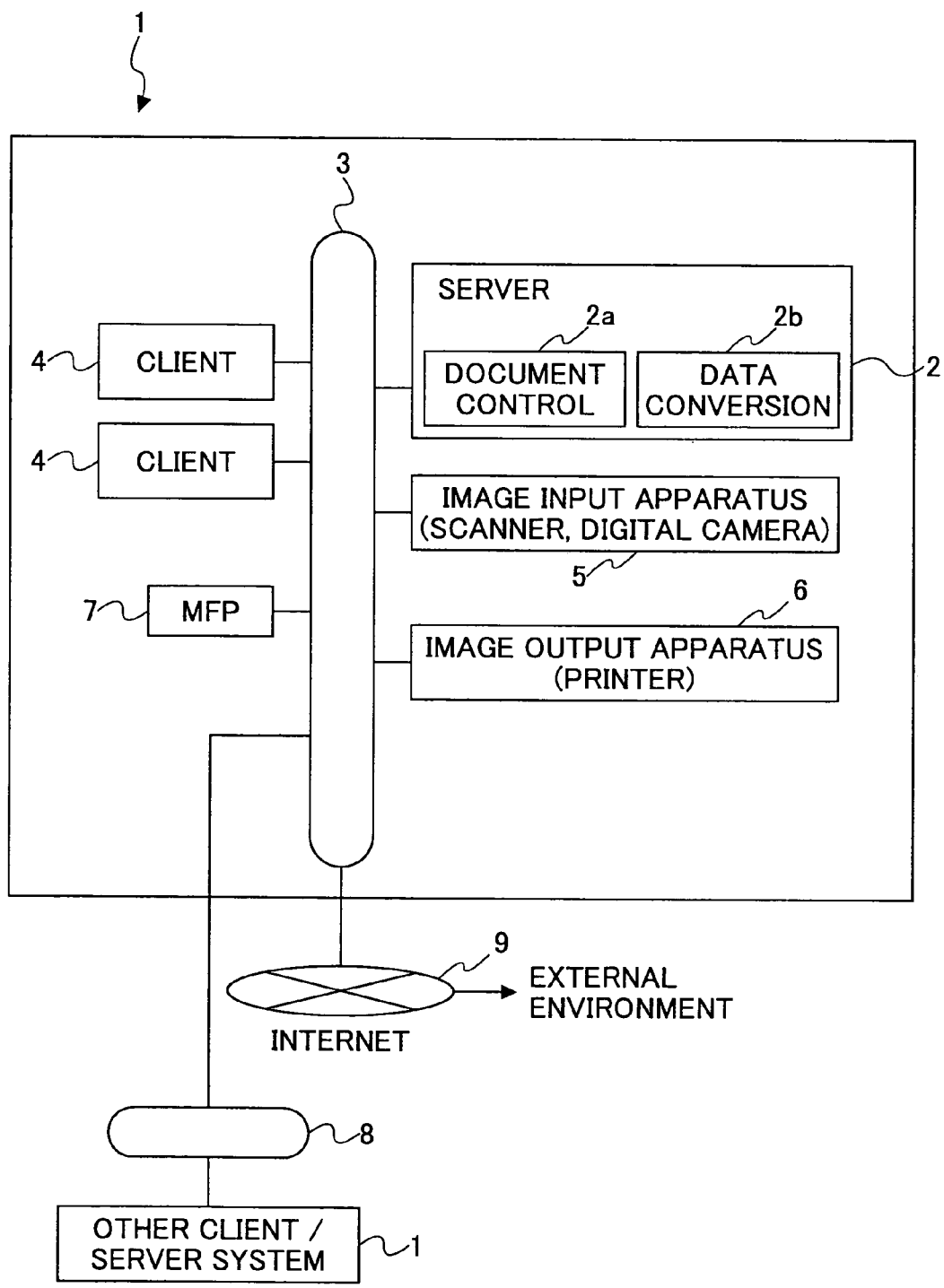
FIG. 7 is a system diagram of one embodiment of an image processing system.

FIG. 7 is a block diagram of an embodiment of an image data processing system 1.

The illustrated exemplary image data processing system 1 is a server client system 1 in which a server computer 2 is connected to a plurality of client computers 4 via a network 3 such as a Local Area Network (LAN). Users of the server client system 1 can share an image input apparatus 5 such as a scanner and/or a digital camera, and an image output apparatus 6 such as a printer that are also connected via the network 3. A Multi Function Peripheral (MFP) 7 is also connected to the network 3. The MFP 7 may function as the image input apparatus 5 and/or the image output apparatus 6.

The server client system 1 may be connected with another server client system 1 via an intranet 8, and with external environment via the Internet, for example.

The server computer 2 is configured with a document control server 2a and a data conversion server 2b. The document control server 2a stores various documents as image data. The data conversion server 2b converts image data into text data by processing the image data with an Optical Character Reader (OCR).

Figure 8:
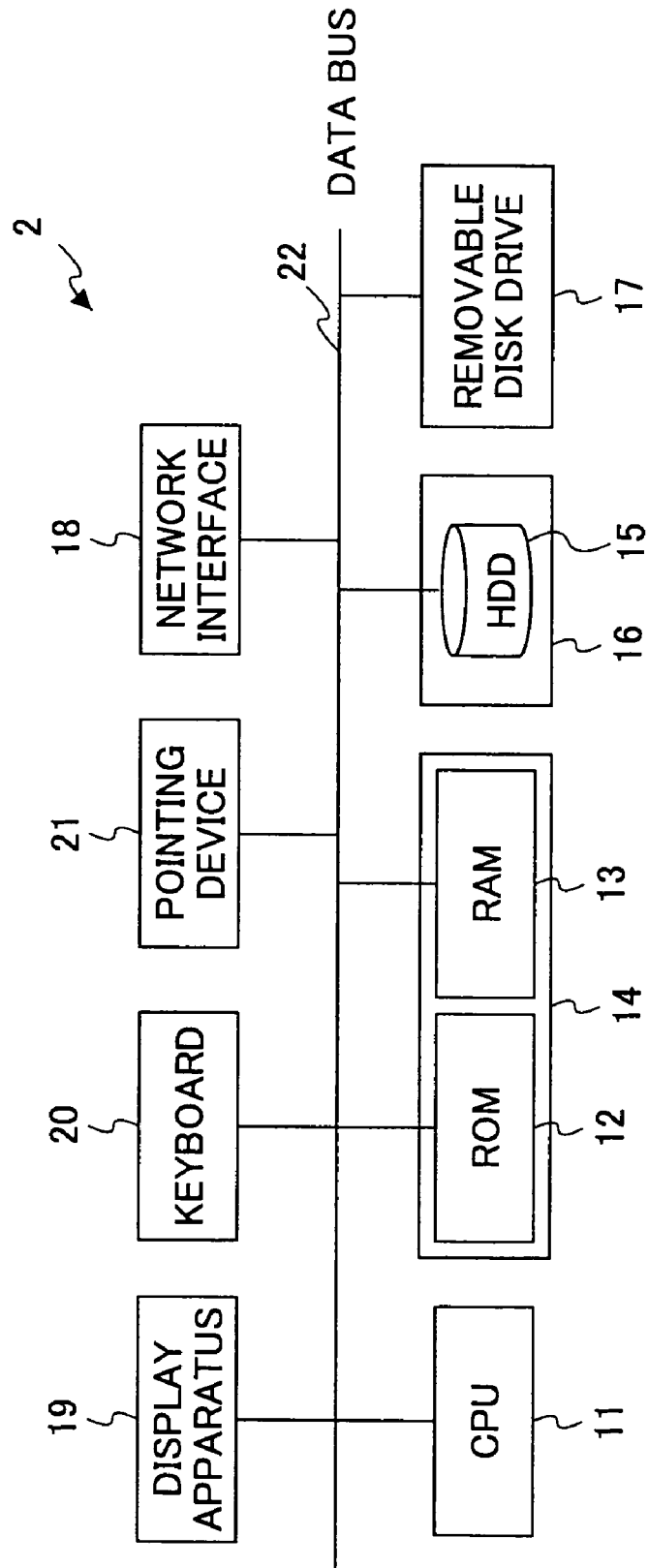
FIG. 8 is a block diagram of one embodiment of an image processing apparatus.

FIG. 8 is a block diagram showing the structure of one embodiment of the server computer 2 that functions as an image processing apparatus. The structure of the client computer 4 is basically the same as that of the server computer 2, and therefore the description of the structure of the client computer 4 is omitted.

The server computer 2 and the client computer 4 each include the following: a Central Processing Unit (CPU) 11, a primary storage device 14 such as Read Only Memory (ROM) 12, Random Access Memory (RAM) 13, a secondary storage device 16 such as a Hard Disk Drive (HDD) 15, a removable disk apparatus 17 such as a CD-ROM drive, a network interface 18, a display device 19 such as a Cathode Ray Tube (CRT) and/or a Liquid Crystal Display (LCD), a keyboard 20, and a pointing device 21 such as a mouse. These elements are connected with each other via a data bus 22. Exchange of data among these elements is controlled by a bus controller (not shown).

As described below, the secondary storage device 16 is used to store codestreams and other data. The removable disk drive 17 is used to read data from a removable disk such as a CD-ROM and/or write data in the removable disk to distribute the data. The network interface 18 is used to exchange data with other computers via the network 3. The display apparatus 19 is used to display information such as history and results of processing to operators. The keyboard 20 and the pointing device 21 are used for the operators to input instructions and information.

According to an embodiment of the present invention, image data are converted with the JPEG 2000 algorithm into compression codes, and stored in the HDD 15 of the client computer 4. In the case of the image shown in FIG. 9, for example, the image is divided into tiles. The tiles are converted into compression codes, and arranged linearly as shown in FIG. 10.

In FIG. 10, SOC is a marker segment indicating the beginning of a codestream. MH is a main header of the codestream. The main header includes parameters common to the entire codestream such as horizontal number of tiles, vertical number of tiles, horizontal amount of image, and vertical amount of image, for example. Encoded data of each tile follow the main header. As shown in FIG. 10, the compressed data of tiles are arranged in the order of tile numbers shown in FIG. 9. EOC marker provided at the end of the codestream is a marker segment indicating the end of the codestream.

Figure 11:
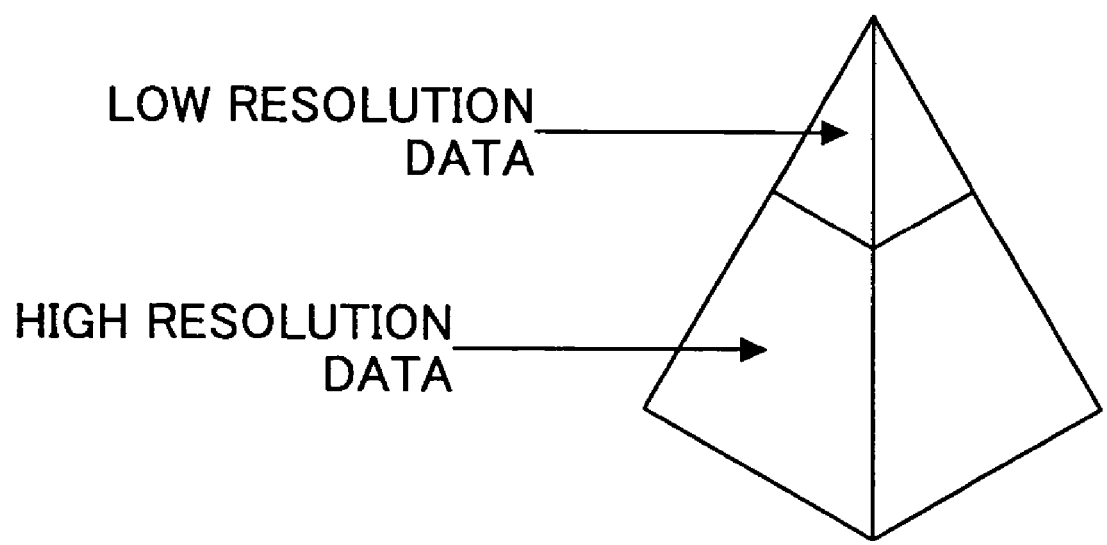
FIG. 11 is a schematic diagram for illustrating a resolution model of compressed data generated with the JPEG 2000 algorithm.

FIG. 11 is a schematic diagram for illustrating the resolution model of compression codes generated with the JPEG 2000 algorithm. As shown in FIG. 11, the compression codes generated by the JPEG 2000 algorithm are dividable into low resolution data and high resolution data. Although the compression codes shown in FIG. 11 are divided into only two portions, the compression codes are dividable at resolutions $\frac{1}{2}$, $\frac{1}{4}$, $\frac{1}{8}$, $\frac{1}{16}$, ..., $\frac{1}{2^n}$ corresponding to the octave decompositions of DWT, where the total resolution is assumed to be 1.

When the server computer 2 and the client computer 4 are switched on, their respective CPUs 11 run a computer program (loader) stored in the ROM 12. Subsequently, the CPU 11 reads a computer program (operating system) stored on the HDD 15 to the RAM 13 and runs the operating system. The operating system controls both hardware and software of the server computer 2 and the client computer 4. The operating system also activates computer programs in response to a user's operation, and writes and reads information, for example. Windows (trade mark) and UNIX (trade mark) are exemplary operating systems. The computer programs that run on the operating system are also referred to herein as application programs.

Each of the server computer 2 and the client computer 4 stores a kind of application program for processing images (an image processing program) in the HDD 15. The HDD 15 functions as a computer readable recording medium that stores the image processing program.

The application programs are often stored in a removable recording medium such as a CD-ROM, a DVD-ROM, and/or a flexible magnetic disk, and are installed onto the secondary storage apparatus 16 such as the HDD 15. Accordingly, a removable recording medium may also function as a computer readable recording medium storing the image processing program. The image processing program may be downloaded from an exterior source to the secondary storage apparatus 16 via the network interface 18.

When the image processing program that operates on the operating system is activated, the CPU 11 is operated according to this image processing program. The CPUs 11 of the server computer 2 and the client computer 4 perform various operational processing and centrally control the entire system of the server computer 2 and the client computer 4, respectively. Following is a description of an operational processing performed by the CPU 11 of the server computer 2 or the CPU 11 of the client computer 4, according to an embodiment of the present invention.

Image Processing Depending on Resolution (OCR Processing)

The Optical Character Reader (OCR) processing is described as an example of image processing depending on the resolution of images.

Figure 12:
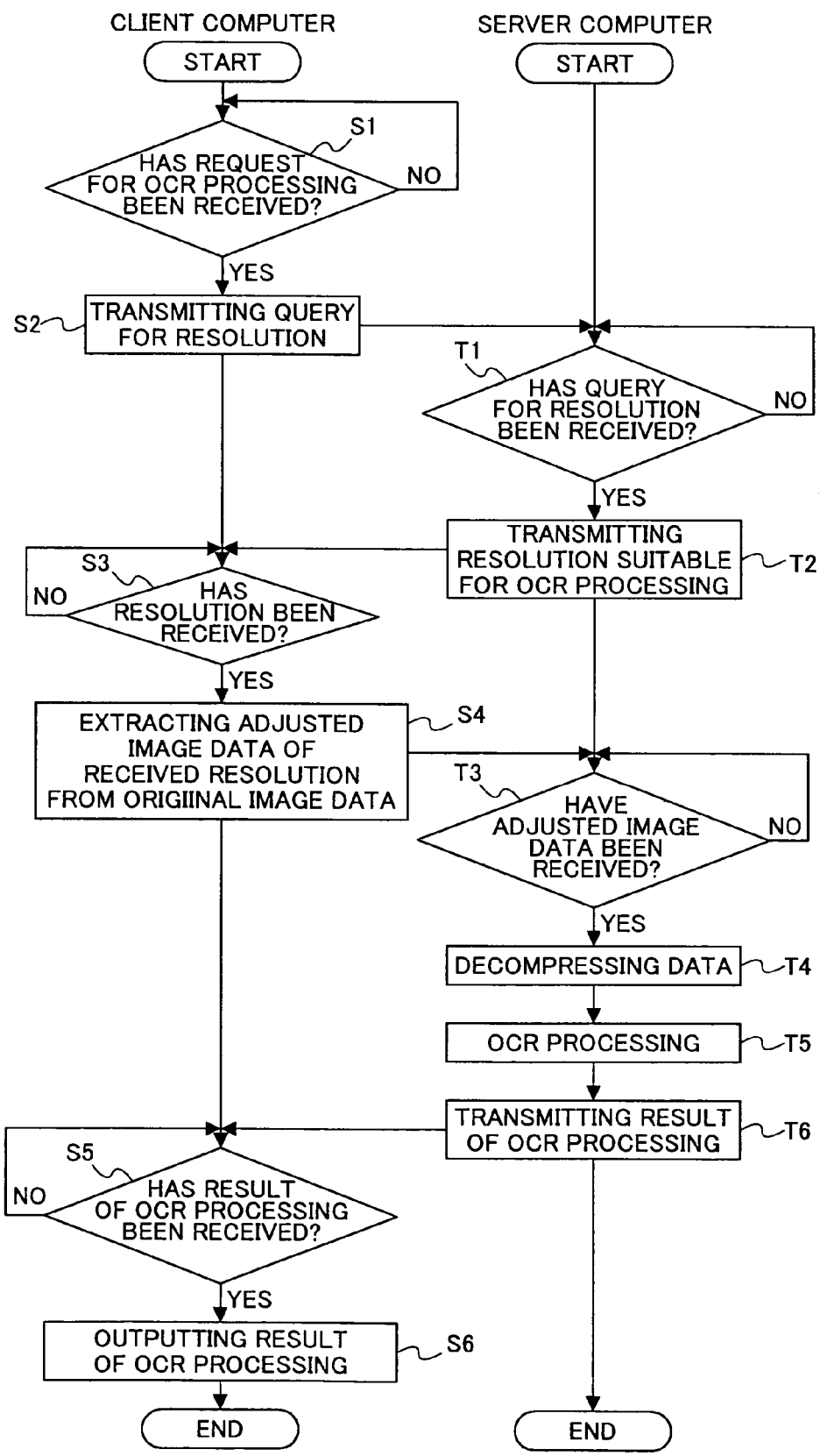
FIG. 12 is a flow diagram of one embodiment of a process showing OCR processing.

FIG. 12 is a flow chart showing the operational flow of OCR processing performed by the server computer 2 and the client computer 4. As shown in FIG. 12, the process of the client computer 4 determines whether an operator of the client computer 4 (the user operating the client computer 4) makes a requested for OCR processing via the keyboard 20 and/or the pointing device 21 (step S1). If the operator requests OCR processing ("Yes" in step S1), the process transmits a query for resolution suitable for OCR processing to the server computer 2 (step S2).

Meanwhile, in response to receipt of the query for resolution suitable for OCR processing transmitted by the client computer 2 ("Yes" in step T1), the server computer 2 transmits resolution information about the resolution suitable for OCR processing to the client computer (step T2). The server computer 2 has the resolution information in, for example, a dictionary file of the image processing program stored on the HDD 15.

The client computer 4, in response to receipt of the resolution information about resolution suitable for OCR processing transmitted from the server computer 2 ("Yes" in step S3), extracts image data (adjusted image data) of which resolution is adjusted to the resolution suitable for OCR processing from the original image data that are to be processed by the server computer 2. The adjusted image data are transmitted to the server computer 2 (step S4).

In an exemplary embodiment, the server computer 2 informs the client computer 4 that 200 dpi is the resolution suitable for OCR processing. The client computer 4 is assumed to store in the HDD 15 image data (original image data) of which resolution is 1200 dpi. As described above, only discrete resolutions having a ratio of $\frac{1}{2^n}$ are extractable from the original image data compressed by the JPEG 2000. Accordingly, image data of 600 dpi, 300 dpi, 150 dpi, and 75 dpi are extractable from the original image data. If adjusted image data of 200 dpi that is informed as suitable for OCR processing is extractable from the original image data, 200 dpi adjusted image data is extracted. In this case, however, 200 dpi adjusted image data is not extractable from the original image data. Accordingly, the resolution that is lower than but closest to 200 dpi suitable for OCR processing may be selected (150 dpi in this case). Alternatively, the resolution that is higher than but closest to 200 dpi suitable for OCR processing may be selected (300 dpi in this case).

The adjusted image data is compressed by the client computer 2. The CPU 11 of the server computer 2, in response to receipt of the compressed adjusted image data of which resolution is suitable for OCR processing ("Yes" in step T3), decompresses the compressed adjusted image data (step T4). Decompression processing of the JPEG 2000 algorithm has already been described in connection with the component transform/inverse transform unit 101, the 2D wavelet transform/inverse transform unit 102, the quantization/inverse quantization unit 103, the entropy encoder/decoder unit 104, and the tag processing unit 105. Accordingly, no further description of decompression processing is given.

The CPU 11 of the server computer 2 processes the decompressed adjusted image data with OCR processing (step T5), and transmits the result of the OCR processing to the client computer 4 (step T6).

A brief description about OCR processing performed in step T5 is given below. There are various methods of OCR processing. Basically, they are identical in the following manner. Character images, for example binary images, are extracted from document images. Each extracted character image is compared, for example via pattern matching, with character images stored in a dictionary file, the character images coupled with respective corresponding character codes. The character image that best matches the extracted character image is selected, and the character code of the best matching character image is output. The best matching of character images is measured as the least difference between the character images or the most similarity of the character images.

In response to receipt of the result of OCR processing as described above ("Yes" in step S5), the client computer 4 displays the result of OCR processing on the display apparatus 19, or outputs the result of OCR processing to the image output apparatus 6 such as a printer or MFP 7 (step S6). The process then ends.

As described above, when performing OCR processing, the client computer 4 transmits a query for the resolution information indicating a resolution suitable for image processing, in this case OCR processing, by the server computer 2. In response to receipt of the query, the server computer 2 transmits the resolution information to the client computer 4. The client computer 4 can generate adjusted image data of which resolution is suitable for image processing by the server computer 2 based on the resolution information, and transmit the adjusted image data to the server computer 2 for OCR processing via the network 3. The client computer 4 does not need to transmit the original image data of which resolution is higher than the resolution suitable for image processing by the server computer 2. The higher the resolution of image data is, the greater the data amount of the image data is. Accordingly, traffic in the network 3 may be reduced by transmitting the adjusted image data instead of the original image data. Even the adjusted image data have a resolution suitable for image processing by the server computer 2. Accordingly, the server computer 2 can process the adjusted images data with OCR processing at predetermined precision. The users of the image processing system can achieve their object (processing the original image) by having the server computer 2 process the adjusted image data.

If an image is encoded with the JPEG 2000 algorithm, the brightness component is extractable from the original image data. Since the server computer 2 can reproduce the outlines of characters based on the brightness component of the original image data, the brightness component of the original image data may be transmitted without color difference component from the client computer 4 to the server computer 2 in step S4. Because binary images are used for OCR processing as described above, even if the binary images of brightness components are used, the server computer 2 can reproduce the outlines of characters and process the reproduced outlines with OCR processing. Accordingly, the traffic in the network 3 can be further reduced by transmitting the brightness component of the original image data.

The second embodiment of the present invention is described below with reference to FIG. 13. Steps identical to steps that are already described in the description of the first embodiment (FIG. 12) are referred to by the same reference numerals, and their description is omitted. The second embodiment is different from the first embodiment in that the resolution is determined using a test image transmitted from the client computer 4 to the server computer 2.

Figure 13:
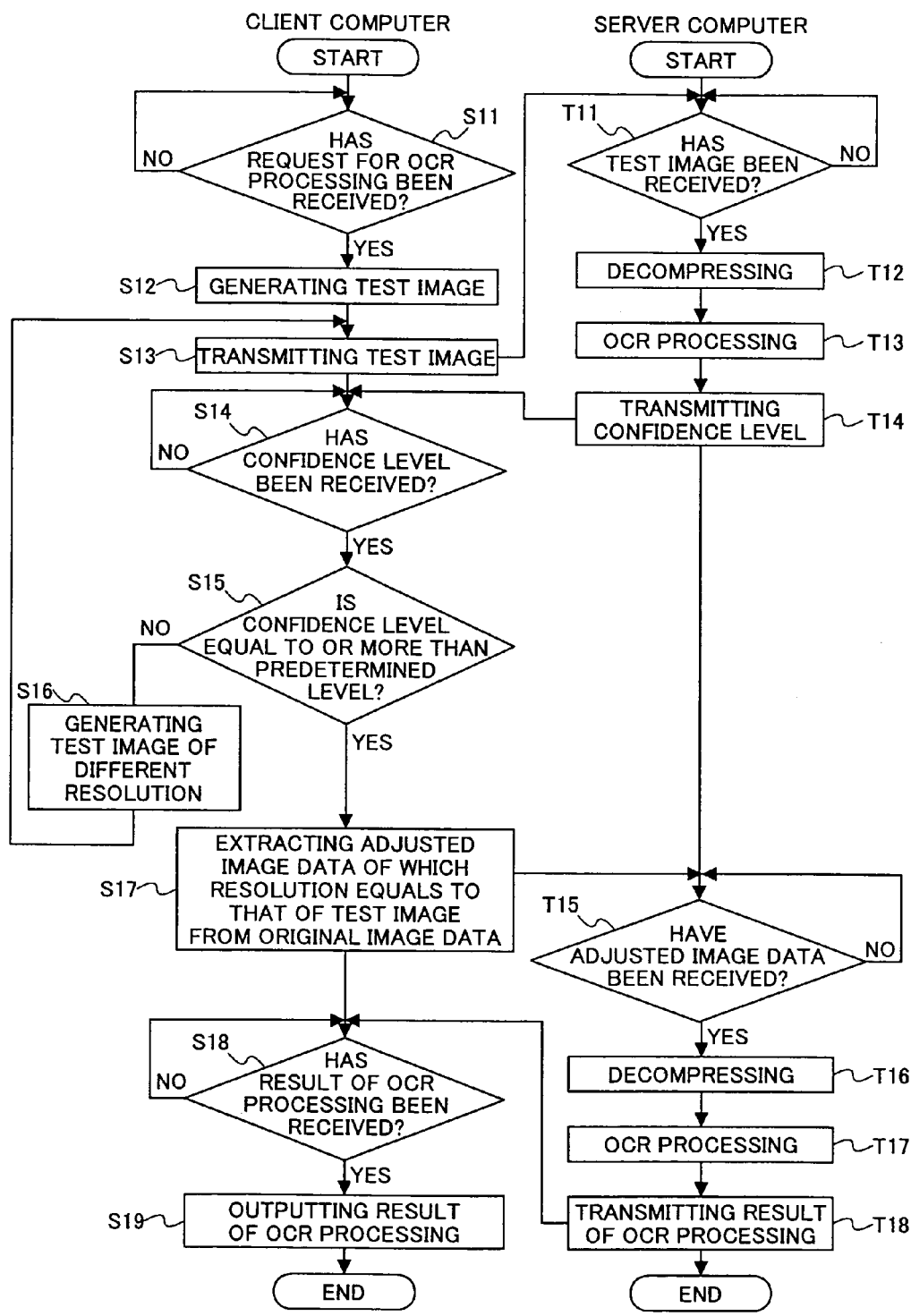
FIG. 13 is a flow diagram of one embodiment of a process OCR processing.

FIG. 13 is a flow chart showing the operational flow of OCR processing performed by the server computer 2 and the client computer 4.

As shown in FIG. 13, a determination is made whether an operator (a user of the client computer 4) makes a request for OCR processing by operating the keyboard 20 and/or the pointing device 21 (step S11). If the request for OCR processing has been made ("Yes" in step S11), the client computer 4 generates a test image for determining a resolution suitable for OCR processing by the server computer 2 (step S12). A partial region of the original image data may be used as the test image. For example, since the original image data stored in the HDD 15 of the client computer 4 is image data encoded by the JPEG 2000 algorithm, a tile that is divided from the original image data may be used as the partial region of the original image data. Accordingly, image data of a certain resolution of a tile may be extracted and used as the test image in step S12.

Even if a source image is not divided into tiles, a precinct may be used as the partial region of the original image data. If the precinct is used as the partial region of the original image data, it is not necessary to expand the entire JPEG 2000 file over memory. Compared with processing that requires expanding the JPEG 2000 file over memory, the use of a precinct can reduce required memory capacity.

The CPU 11 of the client computer 4 transmits the generated test image to the server computer 2 (step S13).

The server computer 2, in response to receipt of the test image from the client computer 4 ("Yes" of step T11), decompresses the compressed codes of the test image (step T12). The server computer 2 performs OCR processing on the decompressed test image (step T13), and computes a confidence level of the result of the OCR processing. The computed confidence level is transmitted to the client computer 4 (step T14).

The confidence level is a value indicating the confidence of the result of OCR processing, for example, and is indicated by an integer between 0 and 100, for example. The greater the integer is, the higher the confidence is. The confidence of the result of OCR processing is computable using a method described, for example, in Japanese Laid-open Patent Application No. 4-211883, the entire content of which is hereby incorporated by reference.

The CPU 11 of the client computer 4, in response to receipt of the confidence level of the result of OCR processing from the server computer 2 ("Yes" in step S14), determines whether the received confidence level is equal to a predetermined level (step S15). That is, a determination is made whether the resolution of the test image is suitable for image processing (OCR processing in this case).

If the received confidence level is not equal to the predetermined level ("No" in step S15), the client computer 4 generates another test image of a different resolution (step S16), and transmits the generated test image to the server computer 2 (step S13).

Specifically, if the received confidence level is higher than the predetermined level, another test image of lower resolution is generated and transmitted to the server computer 2 in order to check the possibility whether, although the precision of character recognition may be lowered, the resolution can be lowered thereby to further reduce the network traffic. If the received confidence level is lower than the predetermined level, another test image of higher resolution is generated and transmitted to the server computer 2 in order to improve the precision of character recognition. Repeating the above processing may improve precision of character recognition and may reduce network traffic.

If the received confidence level is equal to the predetermined level ("Yes" in step S15), adjusted image data of the same resolution as that of the test image are extracted from the original image data, and are transmitted to the server computer 2 (step S17).

The CPU 11 of the server computer 2, in response to receipt of the adjusted image data of the same resolution as that of the test image from the client computer 4 ("Yes" in step T15), decompresses the adjusted image data (step T16).

The CPU 11 of the server computer 2 performs OCR processing on the decompressed adjusted image data (step T17), and transmits the result of the OCR processing to the client computer 4 (step T18).

The client computer 4, in response to receipt of the result of the OCR processing ("Yes" in step S18), displays the result of the OCR processing on the display apparatus 19, or outputs the result of the OCR processing to the image output apparatus 6 such as a printer and the MFP 7 (step S19). The process then ends.

As described above, a determination is made whether a resolution is suitable for image processing by the server computer 2 based on the result of image processing performed on a partial region of the image data. If a determination is made that the resolution of the test image is suitable for image processing by the server computer 2, the resolution of the test image is determined to be the resolution suitable for image processing by the server computer 2. If a determination is made that the resolution of the test image is not suitable for image processing by the server computer 2, the determination is made again whether a different resolution of another test image is suitable for image processing by the server computer 2 based on the result of image processing performed on the other test image. Then, the client computer 4 transmits the adjusted image data of which resolution is changed based on the resolution information to the server computer 2 via the network 3. As described above, the adjusted image data transmitted from the client computer 4 to the server computer 2 is of the lowest resolution suitable for image processing by the server computer 2, of which data size is the minimum. Accordingly, precision of image processing by the server computer 2 can be sustained, and at the same time, the traffic in the network 3 can be reduced.

A third embodiment of the present invention is described below with reference to FIG. 14. Elements identical to those described in the first embodiment are referred to by the same reference numerals and their description is omitted. The third embodiment is different from the second embodiment in that adjusted image data of a region of interest (ROI) is transmitted by the client computer 4 and is processed by the server computer 2. A test image of the ROI is used to determine the resolution of an adjusted image data to be transmitted from the client computer 4 to the server computer 2.

Figure 14:
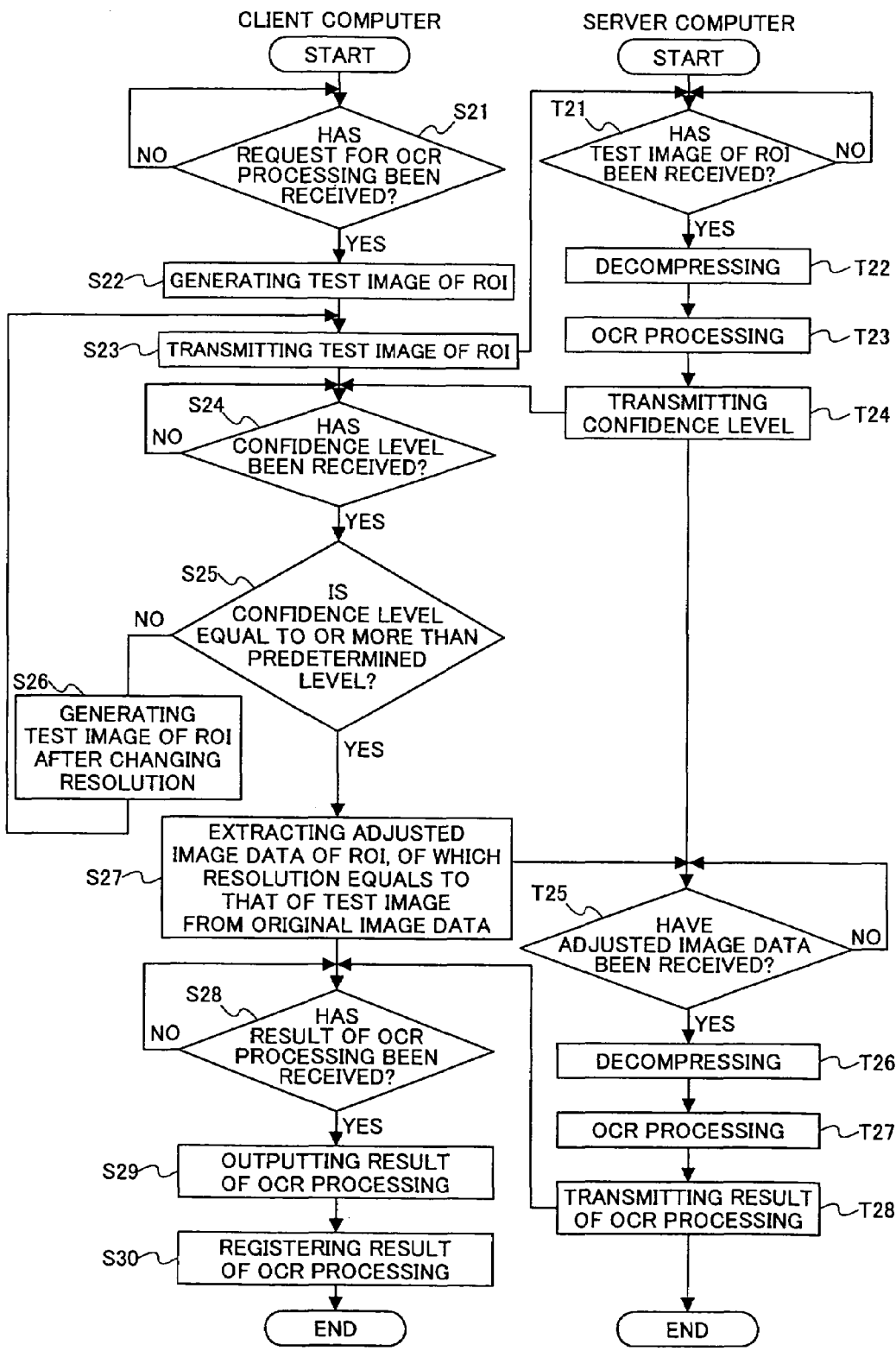
FIG. 14 is a flow diagram of one embodiment of a process OCR processing.

FIG. 14 is a flow chart showing the operational flow of OCR processing performed by the server computer 2 and the client computer 4. As shown in FIG. 14, a determination is made whether an operator (a user of the client computer 4) makes a request for OCR processing by operating the keyboard 20 or the pointing device 21. If it is determined that the operator has requested OCR processing of the ROI designated in the original image data ("Yes" in step S21), the client computer 4 generates a test image of the ROI for determining a resolution suitable for OCR processing by the server computer 2 (step S22). In this case, the test image of the ROI for determining the resolution suitable for OCR processing is, for example, a tile of the ROI. The ROI is defined as an area of the original image, component, or tile-component that is considered of particular relevance by some user defined measure. The ROI can be cut from the entire image, and can be enlarged and/or highlighted relative to the other area of the entire image. When encoding an image with the JPEG 2000 algorithm, the user can designate an ROI. If the ROI is designated, an ROI marker indicating the designated ROI is included in either the main header or the tile-part header. A tile of the designated ROI can be extracted by identifying the ROI marker. If the original image data stored in the HDD 15 of the client computer 4 are encoded by the JPEG 2000 algorithm, the client computer 4 can use a tile of the ROI as the test image of the ROI for determining the resolution suitable for OCR processing by the server computer 2. Accordingly, compressed codes corresponding to the test image of the ROI tile of a certain resolution are extracted from the original image data, and is used as the test image of the ROI (step S22).

The CPU 11 of the client computer 4 transmits the ROI tile as a test image of the ROI to the server computer 2 (step S23).

The server computer 2, in response to receipt of the test image (ROI tile) from the client computer 4 ("Yes" in step T21), decompresses the compressed codes corresponding to the test image (ROI tile) (step T22). Then, the server computer 2 processes the decompressed test image of the ROI with OCR processing (step T23), and computes the confidence level of the result of the OCR processing. The confidence level is transmitted to the client computer 4 (step T24). The confidence level has been described above.

The CPU 11 of the client computer 4, in response to receipt of the confidence level of the result of OCR processing transmitted from the server computer 2, determines whether the received confidence level is equal to a predetermined level (step S25).

If the received confidence level is not equal to the predetermined level ("No" in step S25), the client computer generates another ROI test image of a different resolution (step S26) and transmits the generated ROI test image to the server computer 2 (step S23). Specifically, if the confidence level is higher than the predetermined level, an ROI test image of a lower resolution is transmitted in order to determine whether the lower resolution is suitable for image processing by the server computer 2. Although precision of character recognition may be lowered, the network traffic is further reduced by reducing the resolution of the adjusted image data of the ROI to be transmitted from the client computer 4 to the server computer 2. If the confidence level is lower than the predetermined level, an ROI test image of a higher resolution is transmitted in order to determine whether the higher resolution is suitable for image processing by the server computer 2 in order to increase the precision of character recognition. It is possible to increase the precision of character recognition as well as reduce the network traffic.

If the confidence level is equal to the predetermined level ("Yes" in step S25), adjusted image data of the ROI of which resolution is equal to the ROI test image are extracted and transmitted to the server computer 2 (step S27).

The CPU 11 of the server computer 2, in response to receipt of the adjusted image data of the ROI ("Yes" in step T25), decompresses the adjusted image data of the ROI (step T26).

The CPU 11 of the server computer 2, after performing OCR processing on the decompressed adjusted image data of the ROI (step T27), transmits the result of the OCR processing to the client computer 4 (step T28).

In response to receipt of the result of OCR processing described above ("Yes" in step S28), the client computer 4 displays the result of OCR processing on the display apparatus 19, or outputs the result of OCR processing to the image output apparatus 6 and/or the MFP 7 (step S29). The result of OCR processing is registered and stored in a file (step S30). Then, the process ends.

If the user designates an area of the original image data that contains information about the original image data, the result of OCR processing may be used as a file name of the original image data, a keyword that describes the original image data, and/or an index for searching the original image data. Accordingly, the result of OCR processing is usually registered to systems that control files with their attributes, such as a file management software (an album software, for example) and a document management software (a database management system, for example).

As described above, an ROI test image, for example a tile of the ROI, is transmitted from the client computer 4 to the server computer 2 to determine whether the resolution of the ROI test image (the tile of the ROI) is suitable for image processing by the server computer 2. If a determination is made that the resolution of the ROI test image is suitable for image processing by the server computer 2, the resolution is determined to be the resolution suitable for processing the adjusted image of the ROI. If a determination is made that the resolution of the ROI test image is not suitable for image processing by the server computer 2, another test image of a different resolution is transmitted from the client computer 4 to the server computer 2. The above steps are repeated until a resolution suitable for image processing is determined. Once the resolution suitable for image processing is determined, adjusted image data of the ROI of which resolution is suitable for image processing by the server computer 2 is extracted from the original image data and is transmitted from the client computer 4 to the server computer 2 via the network 3. Since the resolution of the transmitted adjusted image data of the ROI is suitable for image processing by the server computer 2, the server computer 2 can process the transmitted adjusted image data. On the other hand, since the resolution suitable for image processing by the server computer 2 is the lowest resolution that ensures satisfactory result of image processing by the server computer 2, the data size of the transmitted image data is minimized, and traffic in the network 3 is reduced.

In the above description of the preferred embodiments, image processing performed by the image processing system is assumed to be OCR processing. Image processing by the image processing system, however, is not limited to OCR processing. The following image processing techniques are some examples to which the present invention is applicable: image processing that adjusts distortions in image data, image processing that determines the direction of documents using the recognition ratio of characters as a measure, and image processing that extracts titles of documents based on the layouts of the documents.

The present invention is not limited to these embodiments, and various variations and modifications may be made without departing from the scope of the present invention.

This patent application is based on Japanese Priority Patent Application No. 2002-291047 filed on Oct. 3, 2002, the entire contents of which are hereby incorporated by reference.

What is claimed is:

1. A server-client system, comprising:

a server computer; and a client computer to display an image processed by and received from the server computer, the client computer connected to the server computer via a network, wherein the client computer comprises:

a generation unit to generate a test image of a predetermined region of an original image using a certain resolution and to transmit the generated test image to the server computer;

a determination unit to receive a confidence level associated with OCR processing from the server computer and to determine whether the confidence level satisfies a predetermined condition; and a resolution change unit to generate an additional test image using a different resolution and to transmit the additional test image to the server computer, and wherein the server computer comprises:

a confidence level computation unit to decompress the test image received from the client computer, to perform OCR processing on the decompressed test image and to compute the confidence level associated with the result of the OCR processing;

a confidence level transmission unit to transmit the confidence level associated with the OCR processing computed by the confidence level computation unit to the client computer; and an OCR result transmission unit to decompress the test image received from the resolution change unit of the client computer, to perform OCR processing on the decompressed test image, and to transmit the result of the OCR processing to the client computer;

wherein, if the confidence level received from the server computer is higher than a predetermined level, the client computer transmits an additional test image of a lower resolution to the server computer, and if the confidence level received from the server computer is lower than the predetermined level, the client computer transmits an additional test image of a higher resolution to the server computer.

* * * * *